United States Patent
Chen

(10) Patent No.: US 9,576,749 B2
(45) Date of Patent: Feb. 21, 2017

(54) COMBINATION CAPACITOR AND STRIP MATERIAL ARRANGEMENT

(71) Applicant: HOLY STONE ENTERPRISE CO., LTD., Taipei (TW)

(72) Inventor: Yu-Ting Chen, Taipei (TW)

(73) Assignee: HOLY STONE ENTERPRISE CO., LTD., Taipei (TW)

( * ) Notice: Subject to any disclaimer, the term of this patent is extended or adjusted under 35 U.S.C. 154(b) by 253 days.

(21) Appl. No.: 14/466,215

(22) Filed: Aug. 22, 2014

(65) Prior Publication Data

US 2016/0055972 A1    Feb. 25, 2016

(51) Int. Cl.
| | |
|---|---|
| *H01G 4/228* | (2006.01) |
| *H01G 4/248* | (2006.01) |
| *H01G 4/002* | (2006.01) |
| *H01G 2/20* | (2006.01) |
| *H01G 13/00* | (2013.01) |
| *H01G 2/10* | (2006.01) |
| *H01G 4/224* | (2006.01) |
| *H01G 4/236* | (2006.01) |

(52) U.S. Cl.
CPC ............ *H01G 13/003* (2013.01); *H01G 2/103* (2013.01); *H01G 4/224* (2013.01); *H01G 4/236* (2013.01)

(58) Field of Classification Search
CPC ............ H01G 4/26; H01G 4/228; H01G 4/33; H01G 4/248
USPC .................................. 361/310, 308.1, 306.1
See application file for complete search history.

(56) References Cited

U.S. PATENT DOCUMENTS

2003/0137797 A1*  7/2003  Kimoto ................. C04B 35/462
                                                            361/321.2

* cited by examiner

*Primary Examiner* — Eric Thomas
*Assistant Examiner* — Arun Ramaswamy
(74) *Attorney, Agent, or Firm* — Muncy, Geissler, Olds & Lowe, P.C.

(57) ABSTRACT

A combination capacitor and strip material arrangement includes a capacitor element, a strip material, and two connecting wires each including an angled rear mounting part fastened to the strip material, a front contact part providing two contact surfaces connected in series at a predetermined angle and attached to one of positive and negative electrodes of the capacitor element and a middle conducting part having angled portion connected to the angled rear mounting part and an inwardly and transversely extended extension portion connected to the front contact part. Thus, the capacitor element is firmly held down by the contact surfaces of the front contact parts of the two connecting wires for packaging, preventing the capacitor element from deviation, displacement or falling, and thus the capacitor yield can be greatly increased.

6 Claims, 9 Drawing Sheets

COMBINATION CAPACITOR AND STRIP MATERIAL ARRANGEMENT

BACKGROUND OF THE INVENTION

1. Field of the Invention

The present invention relates to ceramic disc capacitor technology and more particularly, to a combination capacitor and strip material arrangement, which comprises a capacitor element, a strip material, and two connecting wires fastened to the strip material to hold the capacitor element for packaging, preventing the capacitor element from deviation, displacement or falling.

2. Description of the Related Art

Capacitor is passive two-terminal electrical component consisting of two conductors separated by a dielectric and used to store energy electrostatically in an electric field. Regular capacitors include three types, namely, wound capacitors, multilayer capacitors and electrolytic capacitors. A multilayer capacitor uses a series of alternating metal disks, called plates, and ceramic (talc ceramic, titanium ceramic, barium titanate ceramic) disks, called dielectrics. This type of capacitor is inexpensive, versatile, and widely used in electronics of all types. The multilayer ceramic capacitor is a more recent development and is often used as a replacement for older designs of various capacitors.

Because modern electronic devices have thin, small and high precision characteristics, high pressure resistive large capacitors are not suitable for use in a micro substrate. In order to meet the requirements for small-sized electronic products, mini ceramic disc capacitors are created. A mini ceramic disc capacitor generally comprises a mini ceramic disc, two electrodes formed of a silver glue and respectively coated on opposing top and bottom surfaces of the mini ceramic disc, two connecting wires respectively bonded to the electrodes and suspended at one same lateral side relative to the mini ceramic disc, and a protective coating coated on the connecting wires and the electrodes. Because the two connecting wires are suspended at one same lateral side relative to the mini ceramic disc, this design of mini ceramic disc capacitor is suitable for through-hole mounting but not practical for SMT (Surface Mount Technology) application. For SMT application, a secondary processing process is necessary to bend the connecting wires.

Further, because the connecting wires are round wires, the mini ceramic disc can easily be forced to display relative to or fall from the round tips of the two connecting wires during the processing, resulting in a bonding or packaging failure, or defective product. An improvement is this regard is necessary.

SUMMARY OF THE INVENTION

The present invention has been accomplished under the circumstances in view. It is one object of the present invention to provide a combination capacitor and strip material arrangement, which positively holds the capacitor element in position for packaging, preventing the capacitor element from deviation, displacement or falling. It is another object of the present invention to provide a combination capacitor and strip material arrangement, which simplifies capacitor processing process, increasing the yield and saving much the cost. It is still another object of the present invention to provide a combination capacitor and strip material arrangement, which is suitable for SMT (Surface Mount Technology) application, facilitating capacitor installation.

To achieve these and other objects of the present invention, a combination capacitor and strip material arrangement, comprises a capacitor element that is a thin, flat, circular member comprising positive and negative electrodes respectively located on opposing top and bottom surfaces thereof, a strip material, and two connecting wires connected between the capacitor element and the strip material. Each connecting wire comprises an angled rear mounting part fastened to the strip material, a front contact part comprising two contact surfaces connected in series at a predetermined angle and attached to one of the positive and negative electrodes of the capacitor element, and a middle conducting part connected between the angled rear mounting part and the front contact part and comprising an inwardly and transversely extended extension portion connected to the front contact part Thus, the capacitor element is firmly held down by the contact surfaces of the front contact parts of the two connecting wires for packaging, preventing the capacitor element from deviation, displacement or falling, and thus the capacitor yield can be greatly increased.

Further, the inwardly and transversely extended extension portions of the middle conducting parts of the two connecting wires are axially aligned suitable for SMT (surface mount technology) application, facilitating capacitor installation.

DETAILED DESCRIPTION OF THE PREFERRED EMBODIMENT

Figure 1:
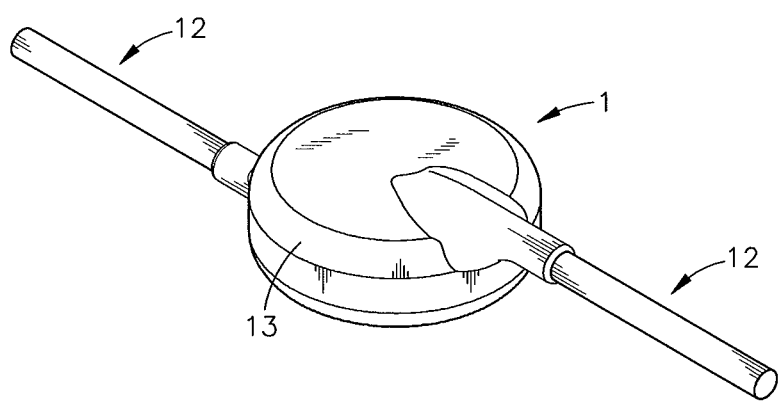
FIG. 1 is an oblique top elevational view of a finished ceramic disc capacitor in accordance with the present invention.

Referring to FIGS. 1-5, a combination capacitor and strip material arrangement in accordance with the present invention is shown. The combination capacitor and strip material arrangement comprises at least one capacitor 1 and a strip material 2.

Each capacitor 1 comprises a capacitor element 11 and two connecting wires 12. The capacitor element 11 is a ceramic disc member, comprising positive and negative electrodes 111 respectively located on opposing top and bottom surfaces thereof. Applying a silver glue to the opposing top and bottom surfaces of the capacitor element 11 by printing, coating or deposition forms the positive and negative electrodes 111. Each connecting wire 12 comprises an angled rear mounting part 121 (having a longitudinally extended fixed end and a transversely extended free end) fastened to the strip material 2, a front contact part 123 attached to one of the positive and negative electrodes 111 of the capacitor element 11, and a middle conducting part 122 connected between (the longitudinally extended fixed end of) the angled rear mounting part 121 and the front contact part 123. The angled rear mounting parts 121 of the two connecting wires 12 are fastened to the strip material 2 with free ends thereof abutted against each other. The middle conducting part 122 comprises an oblique portion 1221 outwardly extended from one end (the longitudinally extended fixed end) of the angled rear mounting part 121 at a predetermined angle (for example, 45-degrees) and suspending outside the strip material 2, an inwardly and transversely extended extension portion 1223 connected to the front contact part 123, and an angled portion 1222 connected between the oblique portion 1221 and the inwardly and transversely extended extension portion 1223. The front contact part 123 comprises two contact surfaces 1231 connected in series at a predetermined angle and kept in contact with the one of the positive and negative electrodes 111 of the capacitor element 11. Further, a protective coating 13 is coated on the capacitor element 11 and the front contact part 123 of each connecting wire 12.

Figure 2:
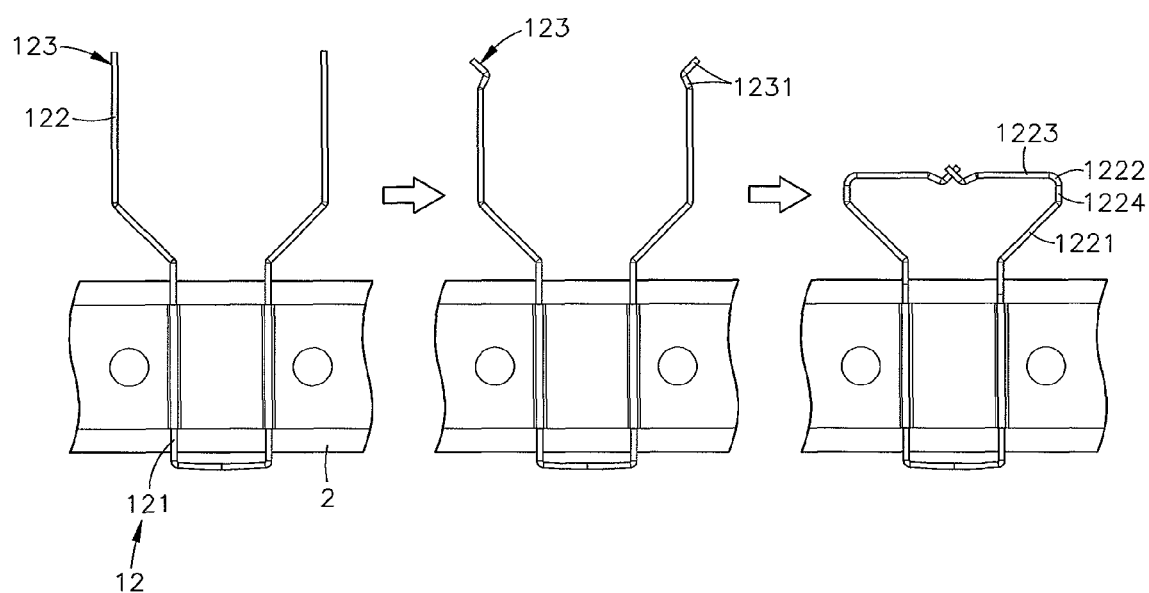
FIG. 2 is a schematic drawing illustrating a ceramic disc capacitor processing process in accordance with the present invention (I).
Figure 3:
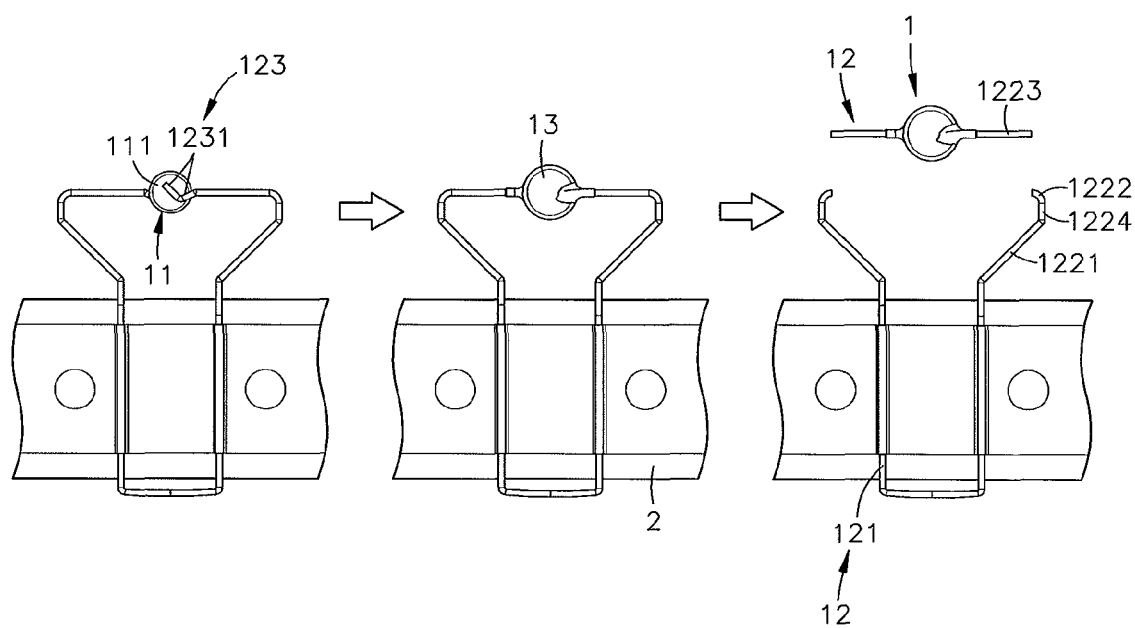
FIG. 3 is a schematic drawing illustrating a ceramic disc capacitor processing process in accordance with the present invention (II).
Figure 4:
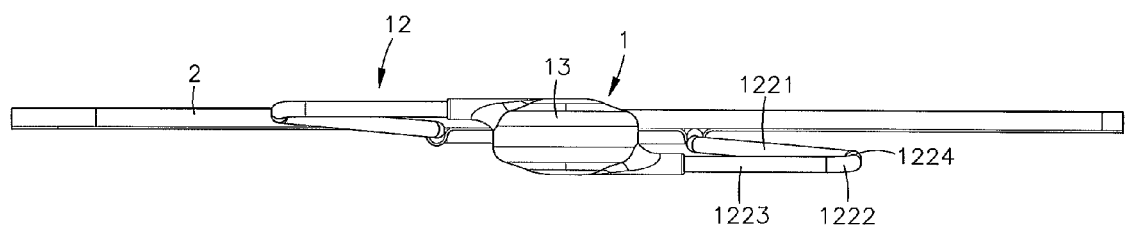
FIG. 4 is a schematic top view illustrating the connecting wires fastened to the strip material and the capacitor element secured to the front contact parts of the connecting wires.
Figure 5:
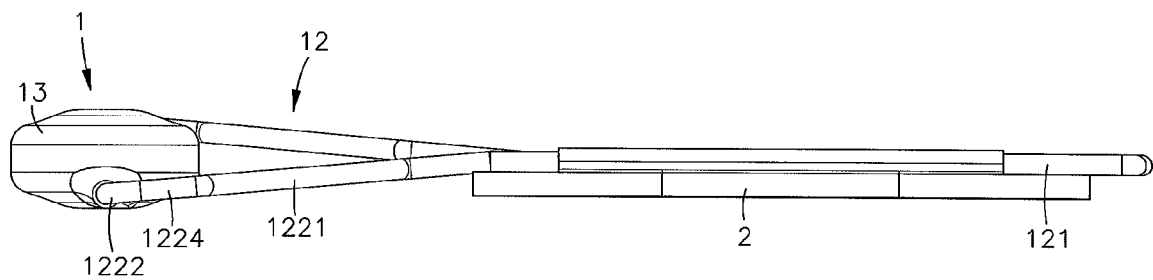
FIG. 5 is a side view of FIG. 4.
Figure 6:
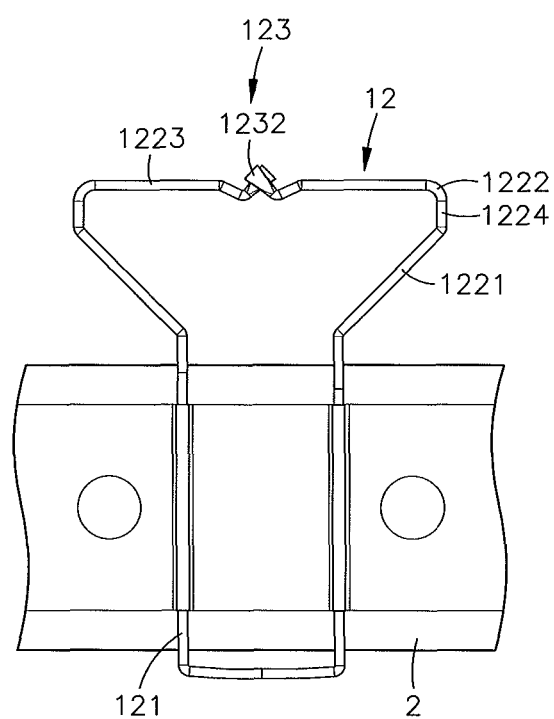
FIG. 6 is a plain view of a second embodiment of the present invention (the capacitor element excluded).
Figure 7:
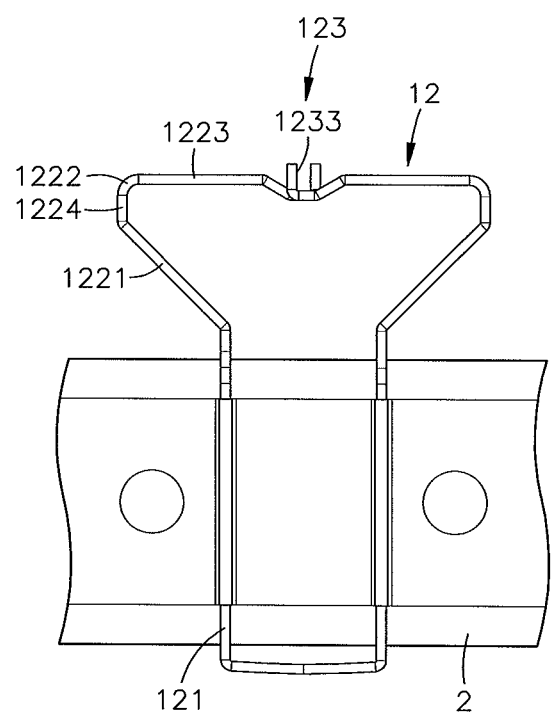
FIG. 7 is a plain view of a third embodiment of the present invention (the capacitor element excluded).
Figure 8:
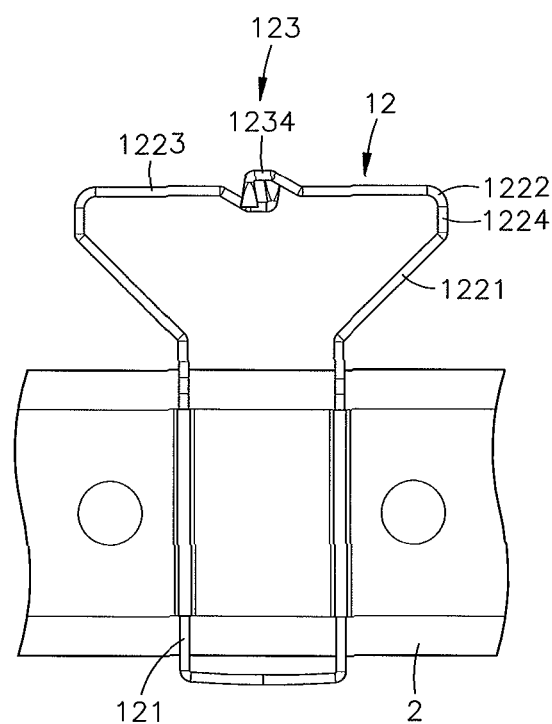
FIG. 8 is a plain view of a fourth embodiment of the present invention (the capacitor element excluded).

During fabrication of the capacitor 1, fasten the angled rear mounting parts 121 of the two connecting wires 12 to the strip material 2, and then bend respective one ends of the connecting wires 12 inwardly and then outwardly to form the respective front contact parts 123 having the respective contact surfaces 1231, and then bend the two connecting wires 12 to the respective middle conducting parts 122 having the respective angled portions 1222 and inwardly and transversely extended extension portion 1223 and to have the front contact parts 123 of the two connecting wires 12 be superimposed on each other in a crossed manner (see FIG. 2). Thereafter, insert the capacitor element 11 in between the front contact parts 123 of the two connecting wires 12 to keep the positive and negative electrodes 111 of the capacitor element 11 in contact the contact surfaces 1231 of the front contact parts 123 of the two connecting wires 12 respectively, and then employ a packaging step to coat the positive and negative electrodes 111 of the capacitor element 11 and the front contact parts 123 of the two connecting wires 12 with a protective coating 13 of an insulative resin, and then cut off the inwardly and transversely extended extension portions 1223 from the middle conducting parts 122 of the two connecting wires 12 (see FIG. 3), and a finished ceramic disc capacitor 1 is thus obtained.

Because the capacitor element 11 is a thin ceramic disc member, it can be positively held between the contact surfaces 1231 of the front contact parts 123 of the two connecting wires 12 for packaging. During transfer, delivery or processing, the capacitor element 11 is firmly held down by the contact surfaces 1231 of the front contact parts 123 of the two connecting wires 12, preventing deviation, displacement or falling, and thus the capacitor yield can be greatly increased. Bending the connecting wires 12 into shape to secure the capacitor element 11 for packaging is quite simple, simplifying the processing process and saving much the cost.

Thus, a finished capacitor 1 in accordance with the present invention comprises a capacitor element 11 having positive and negative electrodes 111 respectively located on opposing top and bottom surfaces thereof, two connecting wires 12 each comprising a front contact part 123 that defines two contact surfaces 1231 connected at a predetermined angle and attached to one of the positive and negative electrodes 111 of the capacitor element 11 and an extension portion 1223 extended from the front contact part 123 and suspending outside the capacitor element 11, and a protective coating 13 of an insulative resin coated on the positive and negative electrodes 111 of the capacitor element 11 and the front contact parts 123 of the two connecting wires 12.

Referring to FIGS. 6-9 and FIGS. 2 and 3 again, the front contact parts 123 of the two connecting wires 12 can be variously embodied. In the first embodiment shown in FIGS. 2 and 3, the two contact surfaces 1231 of the front contact part 123 of each connecting wire 12 are connected in series and extended from the inwardly and transversely extended extension portion 1223 of the middle conducting part 122 of the respective connecting wire 12 obliquely downwards and then upwards. In the second embodiment shown in FIG. 6, the two contact surfaces, referenced by 1232, of the front contact part 123 of each connecting wire 12 are connected in series and extended from the inwardly and transversely extended extension portion 1232 of the middle conducting part 122 of the respective connecting wire 12 obliquely downwards and then upwards and partially overlapped. The front contact parts 123 of the connecting wires 12 in accordance with this second embodiment are flattened. In the third embodiment shown in FIG. 7, the two contact surfaces, referenced by 1233, of the front contact part 123 of each connecting wire 12 are connected in series and extended from the inwardly and transversely extended extension portion 1223 of the middle conducting part 122 of the respective connecting wire 12 obliquely downwards and then transversely forwards and then longitudinally (vertically) upwards. In the fourth embodiment shown in FIG. 8, the two contact surfaces, referenced by 1234, of the front contact part 123 of one connecting wire 12 are connected in series and extended from the inwardly and transversely extended extension portion 1223 of the middle conducting part 122 of the respective connecting wire 12 obliquely downwards and then transversely forwards and then longitudinally (vertically) upwards, and the two contact surfaces 1234, of the front contact part 123 of the other connecting wire 12 are connected in series and extended from the inwardly and transversely extended extension portion 1223 of the middle conducting part 122 of the respective connecting wire 12 obliquely upwards and then transversely forwards and then longitudinally (vertically) downwards.

Figure 9:
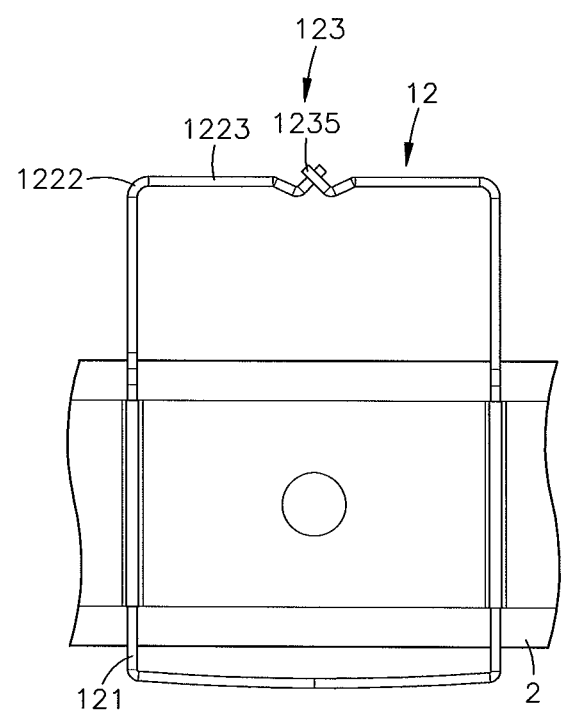
FIG. 9 is a plain view of a fifth embodiment of the present invention (the capacitor element excluded).

In the fifth embodiment shown in FIG. 9, the two contact surfaces, referenced by 1235, of the front contact part 123 of each connecting wire 12 are connected in series and extended from the inwardly and transversely extended extension portion 1223 of the middle conducting part 122 of the respective connecting wire 12 obliquely downwards and then turned biased through a predetermined angle and then extended obliquely upwards.

Referring to FIGS. 2, 3, 6, 7 and 8 again, preferably the middle conducting part 122 of each connecting wire 12 further comprises a straight portion 1224 extending in the longitudinal direction and connected between the angled portion 1222 and the oblique portion 1221.

Referring to FIGS. 2 and 9 again, the middle conducting part 122 of each connecting wire 12 can be directly and longitudinally extended from the angled rear mounting part 121 and terminating in the angled portion 1222 and then the inwardly and transversely extended extension portion 1223 without the aforesaid oblique portion 1221.

In conclusion, the invention provides a combination capacitor and strip material arrangement that has the advantages and features as follows:

1. The middle conducting part 122 of each connecting wire 12 between the angled rear mounting part 121 and the front contact part 123 is configured to provide an oblique portion 1221, an inwardly and transversely extended extension portion 1223 and an angled portion 1222; the front contact part 123 of each connecting wire 12 is configured to provide two contact surfaces 1231; the capacitor element 11 is positively held between the contact surfaces 1231 of the front contact parts 123 of the two connecting wires 12 for packaging; during transfer, delivery or processing, the capacitor element 11 is firmly held down by the contact surfaces 1231 of the front contact parts 123 of the two connecting wires 12, preventing the capacitor element 11 from deviation, displacement or falling, and thus the capacitor yield can be greatly increased.

2. Bending the connecting wires 12 into shape to provide a respective angled rear mounting part 121 for mounting in the strip material 2, a respective front contact part 123 for securing the capacitor element 11 for packaging and a respective middle conducting part 122 between the angled rear mounting part 121 and the front contact part 123 is quite simple, simplifying the processing process and saving much the cost.

3. The two connecting wires 12 are respectively bonded to the positive and negative electrodes 111 at the opposing top and bottom sides of the capacitor element 11 with the respective inwardly and transversely extended extension portions 1223 arranged on one same axis suitable for SMT (Surface Mount Technology) application, facilitating capacitor installation.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A combination capacitor and strip material arrangement, comprising:
    a capacitor element being a thin, flat, circular member comprising positive and negative electrodes respectively located on opposing top and bottom surfaces thereof;
    a strip material;
    two connecting wires connected between said capacitor element and said strip material, each said connecting wire comprising an angled rear mounting part fastened to said strip material, a front contact part, said front contact part comprising two contact surfaces connected in series at a predetermined angle and attached to one of said positive and negative electrodes of said capacitor element, and a middle conducting part connected between said angled rear mounting part and said front contact part, said middle conducting part comprising an inwardly and transversely extended extension portion connected to said front contact part, the inwardly and transversely extended extension portions of the middle conducting parts of said two connecting wires being axially aligned; and
    a protective coating prepared by an electrically insulative resin material and coated on said positive and negative electrodes of said capacitor element and the front contact parts of said two connecting wires,
    wherein the two contact surfaces of the front contact part of each said connecting wire are connected in series and extended from the inwardly and transversely extended extension portion of the middle conducting part of the respective said connecting wire obliquely downwards and then upwards.

2. The combination capacitor and strip material arrangement as claimed in claim 1, wherein said capacitor element is a ceramic disc member; said positive and negative electrodes are formed by applying a silver glue to opposing top and bottom surfaces of said capacitor element using one of printing, coating and deposition techniques.

3. The combination capacitor and strip material arrangement as claimed in claim 1, wherein said front contact parts of said two connecting wires are flattened.

4. The combination capacitor and strip material arrangement as claimed in claim 1, wherein the middle conducting part of each said connecting wire further comprises an oblique portion outwardly extended from one end said angled rear mounting part at a predetermined angle and suspending outside said strip material, and an angled portion connected between said oblique portion and said inwardly and transversely extended extension portion.

5. The combination capacitor and strip material arrangement as claimed in claim 1, wherein the middle conducting part of each said connecting wire further comprises an angled portion longitudinally extended from said angled rear mounting part and then turned in a transverse direction and terminating in said inwardly and transversely extended extension portion.

6. A capacitor, comprising:
    a capacitor element being a thin, flat, circular member comprising positive and negative electrodes respectively located on opposing top and bottom surfaces thereof;
    two connecting wires, each said connecting wire comprising a front contact part, said front contact part comprising two contact surfaces connected in series at a predetermined angle and attached to one of said positive and negative electrodes of said capacitor element, and a middle conducting part comprising an extension portion extended from said front contact part and suspending outside said capacitor element; and
    a protective coating coated on said positive and negative electrodes of said capacitor element and said front contact parts of said two connecting wires,
    wherein said front contact parts of said two connecting wires are flattened; the two contact surfaces of said front contact part of each said connecting wire are connected in series and extended from the extension portion of the middle conducting part of the respective said connecting wire obliquely downwards and then upwards.

* * * * *